United States Patent [19]

Yamashita

[11] Patent Number: 4,858,994
[45] Date of Patent: Aug. 22, 1989

[54] ADJUSTABLE HEADREST FOR AUTOMOTIVE SEAT

[75] Inventor: Takashi Yamashita, Kanagawa, Japan

[73] Assignee: Ikeda Bussan Co., Ltd., Ayase, Japan

[21] Appl. No.: 201,892

[22] Filed: Jun. 3, 1988

[30] Foreign Application Priority Data

Sep. 30, 1987 [JP] Japan .............................. 62-148096[U]

[51] Int. Cl.$^4$ ............................................... A47C 7/36
[52] U.S. Cl. ..................................... 297/391; 297/408
[58] Field of Search ................................ 297/408, 391

[56] References Cited

U.S. PATENT DOCUMENTS

| | | | |
|---|---|---|---|
| 3,429,615 | 2/1969 | Bolk | 297/408 |
| 3,537,749 | 11/1970 | Potsch et al. | 297/408 |
| 4,256,341 | 3/1981 | Goldner et al. | 297/408 |
| 4,322,111 | 3/1982 | Barley et al. | 297/408 |
| 4,370,898 | 2/1983 | Maruyama | 297/408 |
| 4,674,797 | 6/1987 | Tateyama | 297/408 |
| 4,711,494 | 2/1987 | Duvenkamp | 297/408 |
| 4,720,146 | 1/1988 | Maubey et al. | 297/408 |

Primary Examiner—Francis K. Zugel
Attorney, Agent, or Firm—Foley & Lardner, Schwartz, Jeffery, Schwaab, Mack, Blumenthal & Evans

[57] ABSTRACT

An adjustable headrest is disclosed, which comprises a core case in which a tilting mechanism is installed, the core case having at its given portion a pair of slots formed therethrough; a pair of stays extending from the tilting mechanism and projecting outwardly through the slots; a boot structure constructed of an elastic material, the boot structure including a base portion and a pair of tubular portions which are integrally mounted on the base portion, the tubular portions having the stays passed therethrough when the base portion is attached to the given portion of the core case; a pad material molded around the core case with the base portion of the boot structure interposed therebetween; and an outer skin member substantially covering the pad material.

18 Claims, 2 Drawing Sheets

ADJUSTABLE HEADREST FOR AUTOMOTIVE SEAT

BACKGROUND OF THE INVENTION

1. Field of the Invention

The present invention relates in general to a headrest mounted on a seatback of a seat, and more particularly to an adjustable headrest which is mounted on the seatback in such a manner that an inclination angle thereof relative to the seatback is adjustable.

2. Description of the Prior Art

In order to clarify the task of the present invention, one conventional headrest will be described with reference to FIG. 3 of the accompanying drawings. The drawing shows the headrest kept turned upside down.

The headrest shown in the drawing comprises a core case 1 in which a known tilting mechanism is installed. The core case 1 is formed at its bottom wall with a pair of slots 2 (only one is shown) through which stays 3 and 3 extending from the tilting mechanism are projected outwardly. The stays 3 and 3 are put in respective holes formed at a top of a seatback (not shown) upon practical use. A pad material 4, such as foamed polyurethane or the like, is molded around the core case 1. The pad material 4 is covered with a separate outer skin member 5. The outer skin member 5 is of a bag-like article whose mouth portion (not shown) is folded by known clips having the pad material 4 installed therein. A finisher 6 made of a plastic is attached to the folded mouth portion of the outer skin member 5 by connecting screws 8 secured to the core case 1. With this finisher 6, the unsightly folded mouth portion is concealed.

However, due to its inherency in construction, the above-mentioned headrest has the following drawbacks.

That is, for allowing the pivotal movement of the stays 3 and 3 relative to the headrest proper, the pad material 4, the outer skin member 5 and the finisher 6 are formed with through openings 7 which are mated with the respective slots 2 of the core case 1. This induces however that the unsightly interior of the headrest proper is viewed from the outside through the openings 7, deteriorating the appearance of the headrest.

Furthermore, the connection of the finisher 6 to the core case 1 by using the connecting screws 8 is difficult or at least troublesome because of presence of the bulky folded mouth portion of the outer skin member 5 therebetween.

Furthermore, upon molding of the urethane material onto the core case 1, it tends to occur that the material enters the core case 1 through the slots 2 and attaches to the tilting mechanism installed in the core case 1. This causes malfunction of the tilting mechanism.

SUMMARY OF THE INVENTION

It is therefore an object of the present invention to provide an adjustable headrest which is free of the above-mentioned drawbacks.

According to the present invention, there is provided an adjustable headrest which comprises a core case in which a tilting mechanism is installed, the core case having a slot formed therethrough; a stay extending from the tilting mechanism and projecting outwardly through the slot; a boot structure constructed of an elastomeric material, the boot structure including a substantially flat base portion and a tubular portion which is integrally mounted on the base portion, the tubular portion having the stay passed therethrough when, the base portion is attached to the bottom wall of the core case; a pad material molded around the core case with the base portion of the boot structure interposed therebetween; and an outer skin member substantially covering the pad material.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
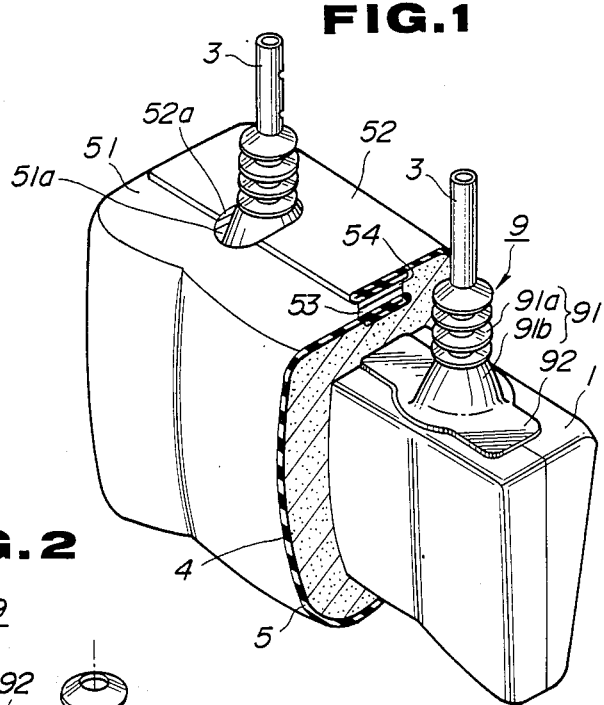
FIG. 1 is a partially broken perspective view of an adjustable headrest according to the present invention, the headrest being shown turned upside down for clarification of the drawing.
Figure 2:
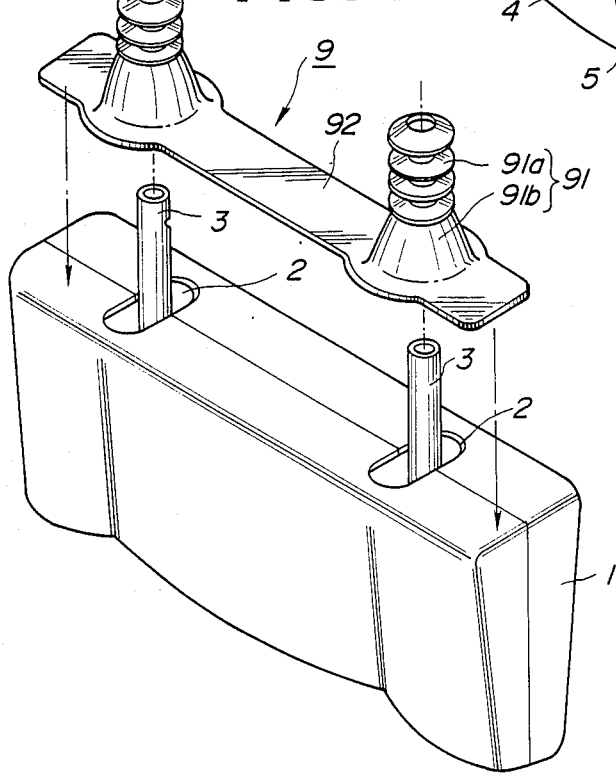
FIG. 2 is an exploded view of essential parts employed in the headrest of the present invention.
Figure 3:
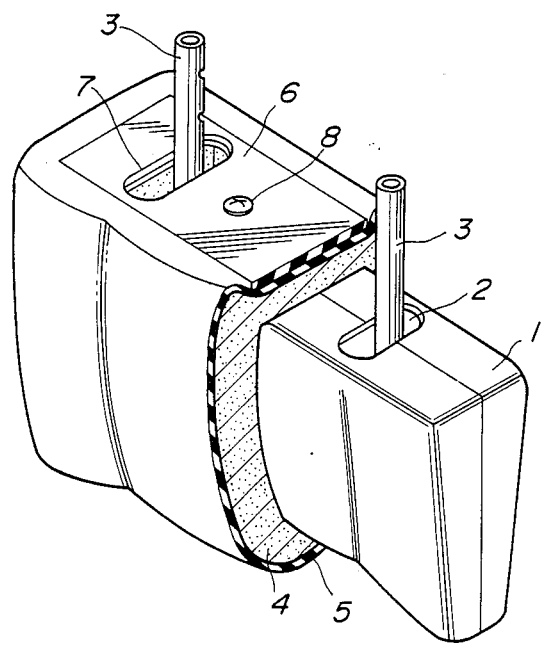
FIG. 3 is a view similar to FIG. 1, but showing a conventional adjustable headrest.

Referring to FIGS. 1 and 2, particularly FIG. 1, there is shown an adjustable headrest according to the present invention. For ease of understanding, similar parts to those of the above-mentioned conventional headrest will be denoted by the same numerals in the drawings.

The adjustable headrest of the present invention comprises a core case 1 in which a known tilting mechanism is installed. The tilting mechanism may be the device which is disclosed in U.S. Pat. No. 4,674,797 granted on June 23, 1987 to Tomoyoshi TATEYAMA. The core case 1 comprises front and rear parts which are welded to each other. As is seen from FIG. 2, the core case 1 is formed at its bottom wall with a pair of slots 2 and 2 through which respective stays 3 and 3 extending from the tilting mechanism are projected outwardly. The size of each slot 2 is so determined as to permit a maximum pivotal movement of the stays 3 relative to the core case 1. Although not shown in the drawings, the stays 3 and 3 are put into respective holes formed at a top of a seatback of a seat upon practical use.

As best understood from FIG. 2, a boot structure 9 is attached to the bottom wall of the core case 1. The boot structure 9 is made of an elastomeric material, such as rubber material, plastic material or the like, and comprises a pair of tubular portions 91 and 91 through which the stays 3 and 3 are passed and an elongate base portion 92 on which the tubular portions 91 and 91 are integrally mounted. Each tubular portion 91 comprises a bellows portion 91a and a conically swelled portion 91b which is arranged between the bellows portion 91a and the base portion 92. As is understood from the drawing, the diameter of the swelled portion 91b gradually decreases as the distance from the base portion 92 increases. Because of the nature of the bellows, the flexible movement of each tubular portion 91 relative to the base portion 92 is optimally carried out. Upon assembly, the base portion 92 is attached to the bottom wall of the core case 1 having the stays 3 and 3 respectively inserted into he tubular portions 91 and 91. Thus, the slots 2 and 2 of the core case 1 are concealed by the swelled portions 91b and 91b of the boot structure 9. For the attachment of the boot structure 9 to the core case 1, a double-faced adhesive tape, adhesive agent, clip or the like may be used.

As is seen from FIG. 1, a pad material 4, such as foamed polyurethane or the like, is molded around the core case 1 with the base portion of the boot structure 9 interposed therebetween. That is, for molding of the pad material 4, the core case 1 is set in a molding die (not shown) together with the boot structure 9 attached thereto. Then, a fluidized material of foamed polyurethane is poured into the molding die and cured under a given condition. It is to be noted that, due to presence of the boot structure 9, the fluidized material does not enter the core case 1. After curing, the pad-wearing product is released from the molding die.

The pad material 4 is covered with an outer skin member 5 which is shaped like a bag. The outer skin member 5 has opposed end portions 51 and 52 which are overlapped at the portions which face the bottom wall of the core case 1. For having the stays 3 and 3 passed therethrough, the overlapped end portions 51 and 52 of the outer skin member 5 are formed with respective cuts 51a and 52a for each stay 3. A fastener consisting of mutually engageable members 53 and 54 is arranged between the overlapped end portions 51 and 52 for achieving a joining therebetween.

In practical use, the headrest is mounted on a top of an associated seatback having the stays 3 and 3 put into the holes formed at the top. A known height adjuster is installed in each hole, which latches the stay 3 at a desired height position of the headrest relative to the seatback.

When adjustment of angular position of the headrest is needed, the headrest is manually inclined forward to a desired position. If the headrest fails to be stopped as the desired position, the same is inclined to its foremost angular position at a stroke and then inclined backward to its rearmost angular position. Thereafter, the position adjustment of the headrest is carried out again. The operation of the headrest is well described in the above-mentioned United States Patent.

In the following, advantages of the present invention will be described.

First, since the slots 2 and 2 of the core case 1 are concealed by the boot structure 9, the unsightly interior of the core case 1 can not be viewed from the outside. The provision of such boot structure 9 is advantageous in protecting the tilting mechanism from contamination with dust.

Second, because of the same reason, the tilting mechanism installed in the core case 1 is protected from the urethane material during molding of the pad material.

Third, because of the nature of the bellows of the boot structure 9, the pivoting movement of the headrest proper relative to the stays 3 and 3 is smoothly carried out.

Fourth, even when the headrest is strongly pushed to such a lower position that the bottom wall of the headrest collides against the top of the seatback, the bellows portions 91a and 91a of the boot structure can smoothly absorb the shock of the collision.

Fifth, since the openings 51a and 52a of the outer skin member 5 are substantially plugged with the conically swelled portions 91b and 91b of the boot structure 9, the unsightly inner parts of the pad material 4 can not be viewed from the outside.

In the following, modifications of the present invention will be described.

If desired, the boot structure 9 may be divided into two parts each including one tubular portion 91 and a shorter base portion 92.

Furthermore, in place of the bellows portion 91a, a straight tubular portion may be included in the tubular portion 91 so long as it has a sufficient flexibility.

Furthermore, if desired, each tubular portion 91 of the boot structure 9 may have a length equal to that of the associated stay 3 of the headrest. In this case, the tubular portion 91 including the bellows portion 91a can serve as an decorative member for the stay 3.

What is claimed is:

1. An adjustable headrest comprising:
    a core case in which a tilting mechanism is installed, said core case having a slot formed through its bottom wall;
    a stay extending from said tilting mechanism and projecting outwardly through said slot;
    a boot structure constructed of an elastomeric material and including a substantially flat base portion and a tubular portion which is integrally mounted on said base portion, said base portion being attached to said bottom wall of said core case whereby said slot is sealingly covered with said substantially flat base portion, said outwardly projecting part of said stay passing through said tubular portion of said boot structure;
    a pad material molded around said core case with the base portion of said boot structure interposed therebetween; and
    an outer skin member substantially covering said pad material.

2. An adjustable headrest comprising:
    a core case in which a tilting mechanism is installed, said core case having a pair of slots formed through its bottom wall;
    a pair of stays extending from said tilting mechanism and projecting outwardly through said slots;
    a boot structure constructed of an elastomeric material and including a substantially flat base portion and a pair of tubular portions which are integrally mounted on said base portion, said base portion being attached to said bottom wall of said core case whereby said slot is sealingly covered with said substantially flat base portion, said outwardly projecting part of said stay passing through said tubular portion of said boot structure;
    a pad material molded around said core case with the base portion of said boot structure interposed therebetween; and
    an outer skin member substantially covering said pad material.

3. An adjustable headrest as claimed in claim 2, in which each of the tubular portions of said boot structure comprises a bellows portion and a conically swelled portion which is arranged between said bellows portion and said base portion.

4. An adjustable headrest as claimed in claim 3, in which the diameter of the swelled portion gradually decreases as the distance from said base portion increases.

5. An adjustable headrest as claimed in claim 4, in which said slots of the core case are concealed by the swelled portions of the boot structure when said boot structure is properly attached to said bottom wall of said core case.

6. An adjustable headrest as claimed in claim 5, in which said base portion of said boot structure is secured to said bottom wall of the core case by means of adhesive.

7. An adjustable headrest as claimed in claim 6, in which said pad material and said outer skin member are each formed with two openings through which said tubular portions of said boot structure are passed respectively.

8. An adjustable headrest as claimed in claim 7, in which said outer skin member has opposed end portions which are overlapped when said outer skin member is properly disposed around said pad material.

9. An adjustable headrest as claimed in claim 8, in which the overlapped end portions of said outer skin member are fastened to each other by means of a fastener.

10. An adjustable headrest as claimed in claim 9, in which the overlapped end portions of the outer skin member are formed with mated openings through which each tubular portion of said boot structure passes.

11. An adjustable headrest as claimed in claim 1, in which the tubular portion of said boot structure comprises a bellows portion and a conically swelled portion which is arranged between said bellows portion and said base portion.

12. An adjustable headrest as claimed in claim 11, in which the diameter of the swelled portion gradually decreases as the distance from said base portion increases.

13. An adjustable headrest as claimed in claim 12, in which said slot of the core case is concealed by the swelled portion of the boot structure when said boot structure is properly attached to said bottom wall of said core case.

14. An adjustable headrest as claimed in claim 13, in which said base portion of said boot structure is secured to said bottom wall of the core case by means of adhesive.

15. An adjustable headrest as claimed in claim 14, in which said pad material and said outer skin member are each formed with an opening through which said tubular portion of said boot structure passes.

16. An adjustable headrest as claimed in claim 15, in which said outer skin member has opposed end portions which are overlapped when said outer skin member is properly disposed around said pad material.

17. An adjustable headrest as claimed in claim 16, in which the overlapped end portions of said outer skin member are fastened to each other by means of a fastener.

18. An adjustable headrest as claimed in claim 9, in which the overlapped end portions of the outer skin member are formed with an opening through which the tubular portion of said boot structure passes.

* * * * *